July 10, 1934.     J. KUHLE     1,965,843
BRAKE SHOE ADJUSTING GAUGE
Filed July 23, 1931     3 Sheets-Sheet 1
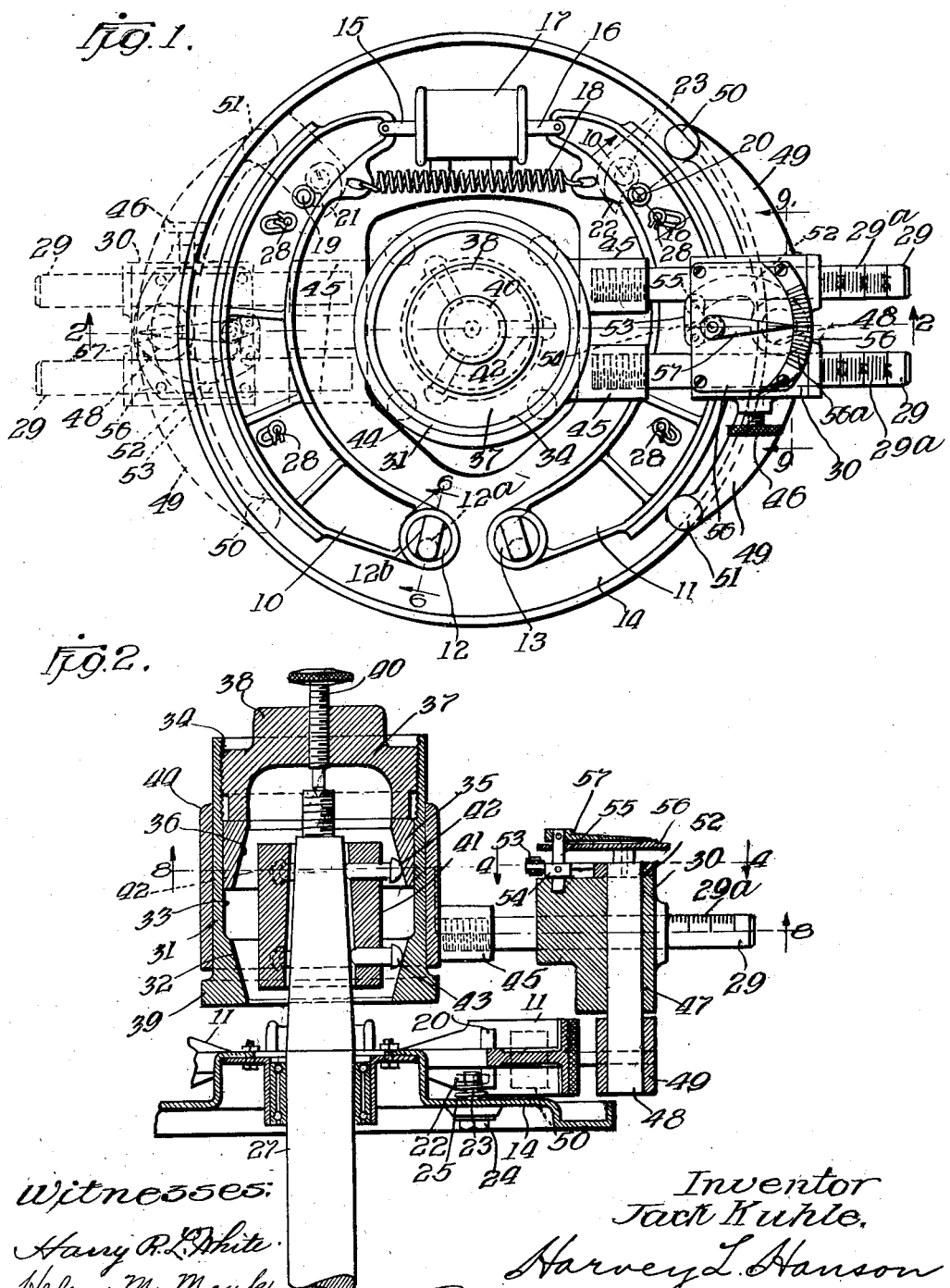

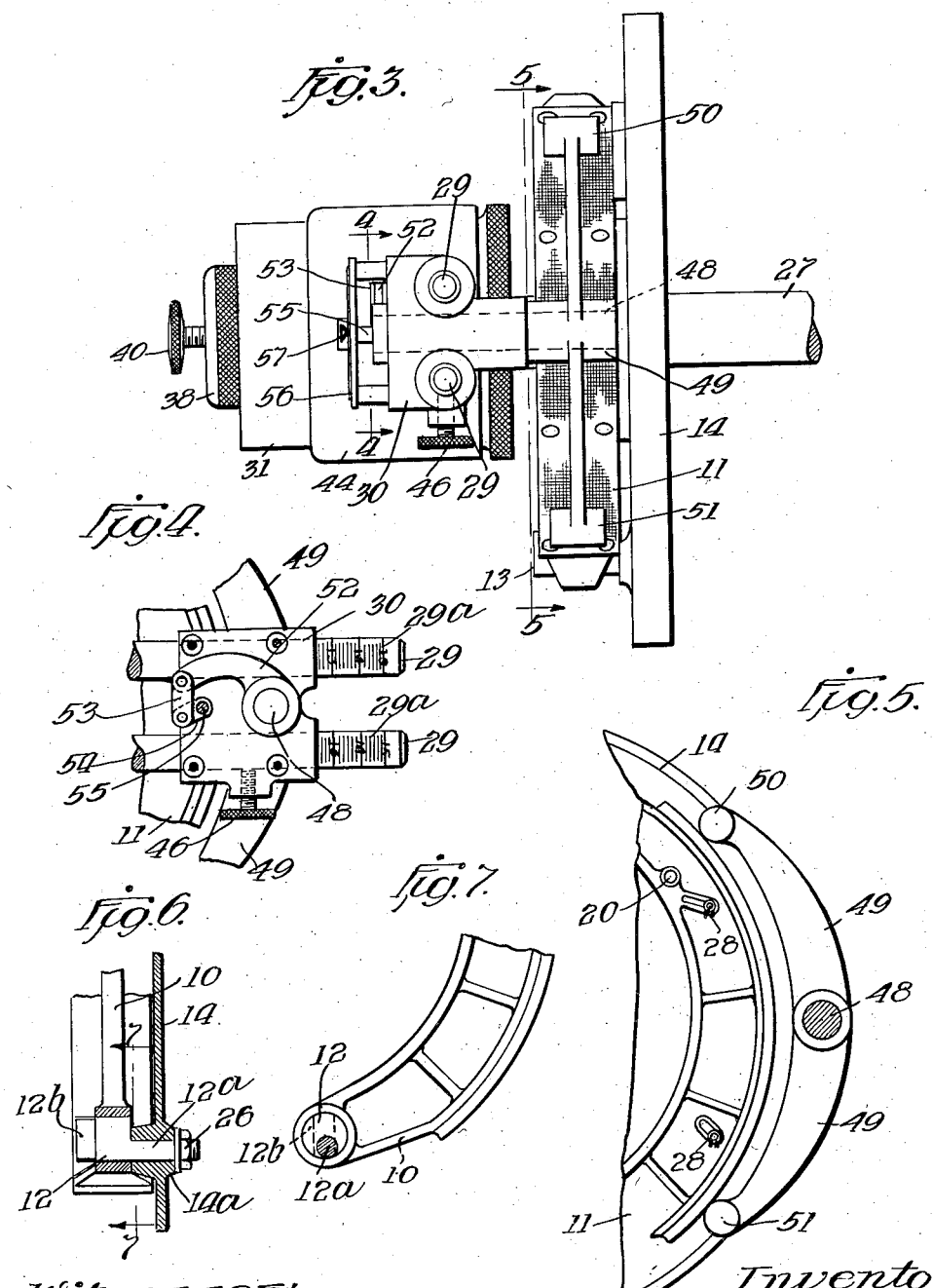

July 10, 1934.   J. KUHLE   1,965,843
BRAKE SHOE ADJUSTING GAUGE
Filed July 23, 1931   3 Sheets-Sheet 3
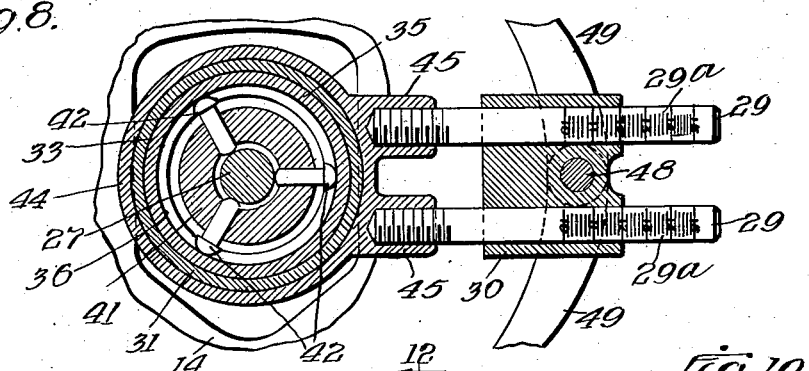
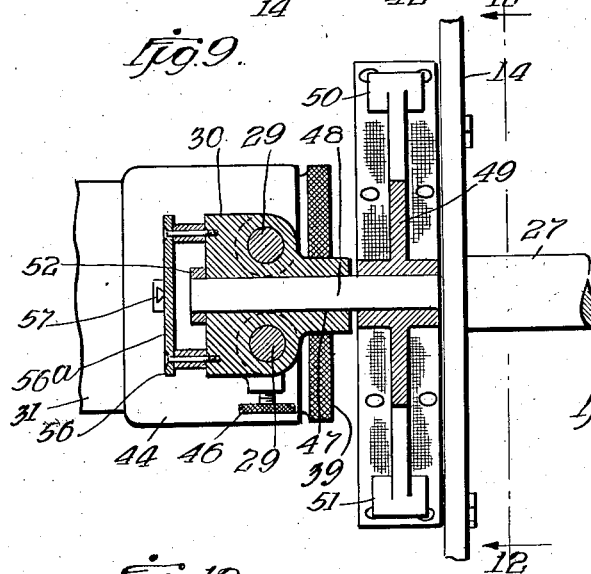
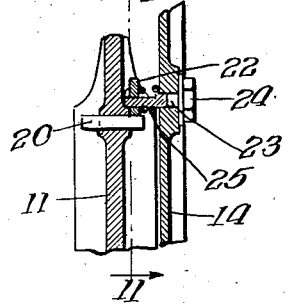
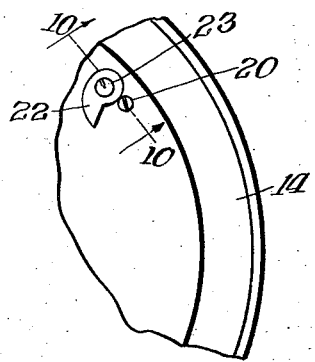
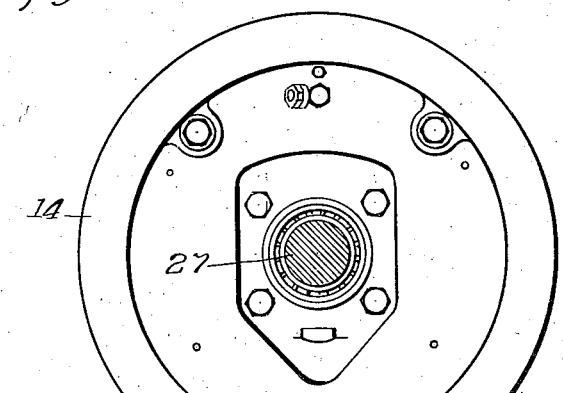
Inventor:
Jack Kuhle.
By Harvey L. Hanson
Attorney.

Patented July 10, 1934

1,965,843

UNITED STATES PATENT OFFICE 1,965,843

BRAKE SHOE ADJUSTING GAUGE

Jack Kuhle, Chicago, Ill.

Application July 23, 1931, Serial No. 552,585

19 Claims. (Cl. 33—180)

The invention relates to brake shoe adjusting gauges and particularly to an improved gauge for adjusting brake shoes, where the shoes are pivotally supported and moved radially of co-operating brake drums in using the brakes, and particularly where the shoes move outwardly against the inner surfaces of cylindrical brake drums, as is commonly the case in connection with brakes used on motor vehicles.

As is well known in the art, the correct operation of brakes of the kind under consideration, depends on the accuracy with which the brake shoes are positioned relatively to their brake drums, when the brake shoes are in their released position.

While this is true generally in connection with such brakes, it is of even more importance in connection with four wheel brakes which are now popular in connection with motor vehicles, on account of it being dangerous, if the brakes on the front wheels are adjusted so that they exert a greater braking effect than is exerted by the brakes on the rear wheels of the vehicle.

Furthermore, with most, if not all, types of brakes of this kind, it is practically impossible to gauge the clearance spaces between the brake shoes and their drums, when the parts are assembled for use, (when in released position) since these constructions are generally enclosed as far as possible, to prevent dirt working into the brake drums and causing undue wear and improper action of the brakes.

By my invention I provide a gauge of simple and sturdy construction by which the brake shoes may be accurately and quickly adjusted to the position they should occupy when released, irrespective of the size, shape and style of the brake drum, which gauge is provided with indicating devices showing whether one part or another part of a brake shoe being adjusted, is in proper position or not, so that when the indicating devices show a zero or neutral condition, the operator can be certain that all parts of the brake shoe being adjusted, are in the position they should be for the released position of the shoe.

I further provide devices for quickly and accurately mounting the gauge on a vehicle axle associated with the brake to be adjusted, which mounting means are readily adjustable to accommodate different kinds and sizes of axles, it being desirable that the gauge shall be mounted on the axle in adjusting the brake shoe, on account of the drum of the brake being carried by a wheel carried by the axle when the brake is in use, and the proper clearances for the brake shoes when they are in their released positions, being determined necessarily by the position of the brake drum.

My invention will best be understood by reference to the accompanying drawings showing a preferred embodiment thereof in which Figure 1 shows a pair of brake shoes in front elevation, with the corresponding wheel and brake drum removed from the structure, and my gauge applied to the axle of the vehicle to adjust one of the brake shoes, Figure 2 is a sectional view of a part of the structure shown in Figure 1, taken along the line 2—2, Figure 3 is a side elevation of the parts shown in Figure 1, taken from the right side of Figure 1, Figure 4 is a sectional view of a part of the construction shown in Figures 2 and 3, taken along the line 4—4, Figure 5 is a sectional view of the construction shown in Figure 3, taken along the line 5—5, Figure 6 is a sectional view of a part of the construction shown in Figure 1, taken along the line 6—6, Figure 7 is a sectional view of the construction shown in Figure 6, taken along the line 7—7, Figure 8 is a sectional view of the construction shown in Figure 2, taken along the line 8—8, Figure 9 is a sectional view of the construction shown in Figure 1, taken along the line 9—9, Figure 10 is a sectional view of a part of the construction shown in Figure 1, taken along the line 10—10, this figure being also a sectional view of the parts shown in Figure 11, taken along the line 10—10, Figure 11 is a sectional view of the parts shown in Figure 10, taken along the line 11—11, and Figure 12 is an end elevation of the parts shown in Figure 9, this view being taken along the line 12—12 in said figure.

Similar numerals refer to similar parts throughout the several views.

As shown in Figure 1, brake shoes 10 and 11 are supported for turning movement on studs 12 and 13, carried by a disk 14 rigidly secured to a part of the vehicle as indicated in Figure 2. The other ends of the brake shoes 10 and 11 are pivotally connected with rods 15 and 16 respectively, which extend into a cylinder 17 for connection with operating pistons in said cylinder in a manner well known in connection with hydraulic brakes.

The end portions of the brake shoes 10 and 11 adjacent the rods 15 and 16 are connected by a retracting spring 18 for moving the shoes to their released position and holding them in said position, when the cylinder 17 is not subjected to brake operating pressure.

The upper end portions of the brake shoes 10 and 11 are provided with stop pins 19 and 20 engaging cams 21 and 22 when the brake shoes are in their released position. As more clearly shown in Figures 10 and 11, the cam 22 is rigidly secured to the inner end of a stud 23 carried by and extending through the disk 14, which stud is provided on its outer end with a flat sided head 24 by which the stud 23 and cam 22 may be rotated for adjustment purposes.

A spring 25 surrounding the stud 23 between the cam 22 and the disk 14, holds the cam in any position to which it may be adjusted. As a result of this construction, turning the cam 22 changes the released position of the upper end of the brake shoe 11 as desired. The cam 21 is similarly mounted and similarly operable to change as desired, the released position of the upper end of the brake shoe 10.

As more clearly shown in Figures 6 and 7, the pivot stud 12 of the brake shoe 10, consists of a first cylindrical portion engaging a corresponding bore in the brake shoe 10 to pivotally support it, and a second cylindrical portion 12a extending eccentrically from the bearing portion of said stud, through a boss 14a on the disk 14, the outer end of the portion 12a being threaded and engaged by a clamping nut 26.

The outer end of the pivot portion of the stud 12 is flattened as shown at 12b to facilitate turning the pivot stud for adjustment purposes. As a result of this construction, by releasing the nut 26 and turning the stud 12, the clearance of the lower portion of the brake shoe from the brake drum may be changed as desired.

The axle associated with the brake shoes described, is shown at 27, and its relation to the parts during adjustment of the brake shoes is most clearly shown in Figure 2, the wheel and brake drum, not shown, having been removed from the axle to permit adjustment of the brake shoes.

Pins 28 carried by the disk 14 and extending through corresponding slots in the brake shoes, are employed to hold said brake shoes in proper relation to said disk against lateral strains that may in any manner be exerted upon the brake shoes, for example in removing the brake drum or placing it in position around the brake shoes.

My improved gauge consists essentially of mounting devices for supporting it on the axle associated with the brake shoes to be adjusted, posts 29, 29 extending from the mounting devices, and a head 30 carried by and adjustable on said posts, which head carries mechanism for engagement with the brake shoe being adjusted and also indicating devices for indicating when the shoe is in correct adjustment.

As shown in Figure 2, the mounting means of my gauge, consists of a tubular member 31 provided with a conical bore 32 at its inner end, and a cylindrical bore 33 extending outwardly from said conical bore, the outer end of the bore 33 being threaded as indicated at 34. A ring 35 is contained in the member 31 and is a sliding fit in the bore 33, said ring being provided with a conical bore 36.

Outside of the ring 35, the member 31 contains a plug 37 externally threaded to engage the threads 34, the central outer portion of the plug extending beyond the outer end of the member 31 as shown at 38, and preferably knurled on its outer surface to facilitate turning the plug in the member 31 in securing the mounting means to the axle 27.

The inner end of the member 31 is extended radially as shown at 39, and preferably knurled on its outer surface to facilitate securing the mounting means to the axle 27, since the securing of the mounting means to the axle is effected by a relative rotation between the member 31 and the plug 37. The plug 37 is centrally bored and threaded to receive a thumb screw 40 having a conical inner end for engagement with the center in the outer end of the axle 27, in positioning the mounting means on the axle.

The conical bores 32 and 36 are sufficiently large to contain within them around the axle, a tubular member 41 having a bore sufficiently large to clear the end of any axle with which the gauge is to be used. The member 41 carries two sets of radial pins 42 and 43 which are sliding fits in corresponding bores in the member 41, and are rounded at their inner ends to engage the surface of the axle 27, and provided at their outer ends with rounded heads to engage the walls of the bores 36 and 32 respectively.

The tubular member 41 is not otherwise connected with the mounting means, but is permitted to find its own position in the mounting means, depending on the size and shape of the axle to which the mounting means is secured. The pins 42 are carefully made of the same length as each other, and the pins 43 are preferably made of shorter length than the pins 42, all of the pins 43 being carefully made of the same length as each other, on account of the axle surfaces engaged by these pins being generally slightly conical.

The conical bores 32 and 36 have their bases towards each other, and the walls of these bores, as well as the ends of the pins 42 and 43, are preferably carefully hardened and ground to insure accurate location of the mounting means on the axle by means of the conical bores and said pins, as well as to insure the parts against wear and resulting inaccuracy in locating the mounting means on an axle.

The outer cylindrical surface of the member 31 is engaged by a bore in a tubular member 44 with a snug fit, the engagement being sufficiently tight to hold the member 44 in any position in which it may be placed during a gauging operation, but permitting movement of the member 44 on the member 31, if necessary or desirable to properly position the posts 29 for use.

The member 44 has extending from it, bosses 45 in which the inner ends of the posts 29 are rigidly secured, said posts being in parallel relation and preferably equally spaced circumferentially from and parallel to a radial line through the member 44.

The head 30 is provided with parallel bores to receive the posts 29 with a sliding fit, and is provided with a clamping screw 46 for holding the head in desired adjustment on said posts. The posts 29 are preferably provided with graduations 29a to facilitate locating the head accurately on the posts in any desired adjustment, depending upon the particular size of brake shoes to be adjusted.

As shown in Figure 2, the head 30 is provided with a bore 47 extending between the posts 29 and perpendicularly to the plane thereof, in which a shaft 48 is rotatably mounted. The end of the shaft 48 adjacent the brake mechanism when the gauge is in use, has rigidly secured thereto a yoke 49 having curved ends carrying cylindrical gauging members 50 and 51 for engagement with the end portions of the braking surface of a brake shoe when the shoe is being adjusted.

The other end of the shaft 48 has rigidly secured thereto a crank 52, which, as more clearly shown in Figure 4, is pivotally connected at its outer end by a link 53 with the outer end of a shorter crank 54 rigidly secured to a rod 55 supported for angular movement by the head 30, as indicated in Figure 2.

The rod 55 extends through a plate 56 rigidly supported by the head 30, and on its end carries a pointer 57, having its end adjacent graduations 56a on the plate 56.

As a result of the construction just described, slight angular movements of the yoke 49 are multiplied and communicated to the pointer 57, so that by means of the graduations 56a, it may be accurately determined when the yoke is in the position required for accurate adjustment of a brake shoe being adjusted.

In using my improved gauge, for example in adjusting the brake shoes of a motor vehicle, the wheel and brake drum associated with the brake shoes to be adjusted, are first removed from the corresponding axle illustrated at 27 in the drawings.

The diameter of the surface of the brake drum corresponding with the brake shoes, is then carefully measured, and this measurement becomes the basis for the subsequent setting of the gauge, and will be referred to as the drum diameter.

Next the gauge is mounted on the outer end of the axle 27, with the conical bores 32 and 36 separated axially sufficiently to permit the pins 42 and 43 to move freely over the end surface of the axle to the proper location of the mounting means of the gauge on the axle.

At this time, the head 30 is on the outer end portions of the posts 29, 29 so that the cylindrical members 50 and 51 do not engage the brake shoe during the mounting of the gauge on the axle. Then the inner pointed end of the screw 40 is placed in the center in the end of the axle and adjusted until the posts 29, 29 are in a position to center the cylindrical members 50 and 51 laterally over the surface of the brake shoe to be later engaged by said cylindrical members.

Then, with the screw 40 held firmly against the end of the axle, the plug 37 is screwed into the tubular member 31 until the walls of the conical bores 32 and 36 press the pins 43 and 42 tightly against the end portion of the axle, thereby firmly attaching the mounting means of the gauge to the axle in accurately centered relation, and affording a rigid support for the posts 29, 29 in a plane perpendicular to the axis of the axle 27 and substantially parallel with and equally spaced circumferentially from a radius through the axis of the axle in said plane.

Then, the head 30 is moved on the posts 29, 29 towards the axle 27, until the outer edge of the head is accurately in line with the ones of the graduations 29a, 29a indicated by the drum diameter, in which position the head is rigidly secured by turning the clamping screw 46 tightly against one of the posts 29, 29.

In this connection, it is to be noted that several systems may be employed in connection with graduating the posts 29, 29.

First, the posts may have arbitrary or equally spaced graduations, if desired, and then by means of a calibration table or curve, the exact setting of the head on the posts 29, 29, may be determined by comparing the drum diameter with the table or curve.

Second, the graduations may be unequally spaced to compensate for different drum diameters and may be so placed on the posts 29, 29 that when the brake shoe is properly adjusted at its ends, the inner surfaces of the cylindrical members 50 and 51 will be in a circle of the same diameter indicated by the graduations on the posts 29, 29, in which case, before adjusting the brake shoe for proper clearance, the operator sets the head 30 relatively to the graduations 29a, 29a at a point of slightly less diameter than the drum diameter, to allow for the desired clearance.

Third, (which is the preferred manner of graduating the posts 29, 29,) the graduations on the posts may be unequally spaced to compensate for different drum diameters and may be placed on the posts to provide standard clearances for the brake shoes. Furthermore the graduations may be spaced to also provide for a different clearance for one drum diameter than is provided for a different drum diameter, so all that is required of the operator is to set the head 30 on the posts 29, 29 at exactly the same reading of the graduations 29a, 29a as the drum diameter, in which case the clearances between the brake shoe and the drum are provided for by the location of the graduations on the posts 29, 29.

With the head 30 accurately set on the posts 29, 29, and assuming that the brakes have been in use, there will be small clearances between the braking surface of the brake shoe 11, and the cylindrical members 50 and 51, although these clearances may not be properly related.

To adjust the brake shoe, the nut on the pivot stud 13, corresponding to the nut 26 shown in Figure 6, is released, the flattened end of the stud 13 is engaged by a suitable wrench, and the head 24 on the rod 23 is engaged by a second wrench, and the rod 23 and the pivot stud 13 are turned until there is no clearance between the brake shoe 11 and the cylindrical members 50 and 51, with the pointer 57 in its central or zero position.

From the construction described, it will be observed that if the stud 13 is in a position moving the corresponding part or the heel of the brake shoe too far outwardly, then the cam 22 carried by the rod 23 is in a position permitting the corresponding part or toe of the brake shoe to be in a position too far inwardly, for a condition of no clearance between the brake shoe and the cylindrical members 50 and 51, which as far as it goes, would indicate that the brake shoe is properly adjusted. For this condition, however, the pointer 57 is above its zero or neutral position as shown for the relation of the parts in Figure 1, showing that the adjustment of the brake shoe is not correct, and the pivot stud 13 and rod 23 are turned slightly to move the heel portion of the brake shoe inwardly, and the toe portion of the brake shoe outwardly, until the pointer 57 is in its zero or neutral position.

Similarly, if the heel portion of the brake shoe is too far inwardly and the toe portion is too far outwardly, even if there is no clearance between the brake shoe and cylindrical members 50 and 51, the pointer 57 will occupy a position below its neutral or zero position, for the relation of the parts shown in Figure 1, which is corrected by turning the stud 13 and the rod 23 to move the heel portion of the brake shoe outwardly and the toe portion of the brake shoe inwardly until the pointer 57 is in its neutral or zero position.

In any event, the stud 13 and the rod 23 are turned until there is no clearance between the braking surface of the brake shoe 11 and the cylindrical members 50 and 51, at the same time that the pointer 57 occupies its zero or neutral position. For this condition of adjustment, the brake shoe is accurately adjusted, assuming that the requisite clearance is taken care of according to one of the systems above referred to.

It will also be observed that while the yoke 49 is free to turn with the shaft 48 a limited amount, with multiplied movement of the pointer 57 as referred to above, the pointer 57 may be secured to its supporting rod in a position angularly, to provide any desired relation between the brake shoe clearances at the heel and toe portions of the brake shoe, good practice dictating that the clearance at the heel portion shall be less than the clearance at the toe portion.

If preferred, the adjustment of the pointer 57 on its supporting rod may be such that when the pointer is in its zero or neutral position, the clearances at the heel and toe portions of the brake shoe will be equal. In that case the position of proper adjustment of the brake shoe will be a position for which the pointer 57 occupies a displaced position from its neutral or zero position, one side or the other, to indicate the difference in clearances between the heel and toe portions of the brake shoe.

For example, in adjusting the brake shoe 11 as illustrated in Figure 1, with this manner of mounting the pointer 57, the pointer would occupy a position above its zero or neutral position, for the relation of the parts shown in Figure 1, when the brake shoe 11 is in proper adjustment to give a desired greater amount of clearance at its toe portion than is provided at its heel portion.

It is understood of course, that where proper brake shoe clearances are referred to above, clearances between the brake shoe and the brake drum are meant, which are recognized as desirable clearances with the brake shoe in its released position.

When the brake shoe 11 is properly adjusted as described, the nut on the stud 13 is tightened, the posts 29, 29, and hub 44 are rotated on the member 31 and the gauge is swung to the position indicated in dotted lines in Figure 1 adjacent the brake shoe 10, without change of the setting of the head 30 on the posts 29, 29, and the position of the brake shoe 10 is adjusted in the manner above described by turning its pivot stud 12 and the rod supporting the cam 21 until the same condition of clearance of the brake shoe relatively to the brake drum is effected, as that resulting from the adjustment of the brake shoe 11 above described.

While I have shown my invention in the particular embodiment above described, it will be understood that I do not limit myself to this exact construction as I may employ equivalents known to the art at the time of the filing of this application without departing from the scope of the appended claims.

What I claim is:

1. In a gauge of the class described, the combination of means for mounting the gauge on an axle, a gauge supporting member carried by said mounting means, parallel posts supported by said member and extending therefrom transversely of said axle, a head movable longitudinally on said posts, a clamping device for holding said head in desired position on said posts, said posts carrying graduations for setting said head on said posts, a shaft mounted in said head substantially parallel with said axle for rotary movement in said head, a yoke carried by said shaft and extending in opposite directions therefrom over the end portions of a brake shoe to be adjusted, cylindrical members carried by said yoke for engagement with the braking surface of the end portions of said brake shoe, a pointer carried by said head, and means connecting said pointer with said shaft, said pointer indicating the relative radial positions of said cylindrical members with respect to the axle.

2. In a gauge of the class described, the combination of means for mounting the gauge on an axle, a gauge supporting member carried by said mounting means, parallel posts supported by said member and extending therefrom transversely of said axle, a head movable longitudinally on said posts, a clamping device for holding said head in desired position on said posts, said posts carrying graduations for setting said head on said posts, a shaft mounted in said head substantially parallel with said axle for rotary movement in said head, a yoke carried by said shaft and extending in opposite directions therefrom over the end portions of a brake shoe to be adjusted, cylindrical members carried by said yoke for engagement with the braking surface of the end portions of said brake shoe, a pointer carried by said head, and means connecting said pointer with said shaft, said pointer indicating the relative radial positions of said cylindrical members with respect to the axle, said mounting means comprising a tubular shell supporting said supporting member, a plug movable axially in one end of said shell, an element in said shell and operated by axial movement of said plug, and axle clamping devices engaging said shell and said element and movable radially by relative movement of said shell and plug axially.

3. In a gauge of the class described, the combination of means for mounting the gauge on an axle, a gauge supporting member carried by said mounting means, parallel posts supported by said member and extending therefrom transversely of said axle, a head movable longitudinally on said posts, a clamping device for holding said head in desired position on said posts, said posts carrying graduations for setting said head on said posts, a shaft mounted in said head substantially parallel with said axle for rotary movement in said head, a yoke carried by said shaft and extending in opposite directions therefrom over the end portions of a brake shoe to be adjusted, cylindrical members carried by said yoke for engagement with the braking surface of the end portions of said brake shoe, a pointer carried by said head, and means connecting said pointer with said shaft, said pointer indicating the relative radial positions of said cylindrical members with respect to the axle, said mounting means comprising a tubular shell supporting said supporting member, a plug movable axially in one end of said shell an element in said shell and operated by axial movement of said plug, axle clamping devices engaging said shell and said element and movable radially by relative movement of said shell and plug axially, and a centering screw extending axially through said plug to engage a center in said axle.

4. In a gauge of the class described, the combination of means for mounting the gauge on an axle, a gauge supporting member carried by said mounting means, parallel posts supported by said member and extending therefrom transversely of said axle, a head movable longitudinally on said posts, a clamping device for holding said head in desired position on said posts, said posts carrying graduations for setting said head on said posts, a shaft mounted in said head substantially parallel with said axle for rotary movement in said head, a yoke carried by said shaft and extending in opposite directions therefrom over the end portions of a brake shoe to be adjusted, cylindrical members carried by said yoke for engagement with the braking surface of the end portions of said brake shoe, a pointer carried by said head, and means connecting said pointer with said shaft, said pointer indicating the relative radial positions of said cylindrical members with respect to the axle, said mounting means comprising a tubular shell supporting said supporting member, a plug movable axially in one end of said shell, a first tubular member fitting in said shell and having a conical bore diverging inwardly and engaging said plug, the other end of said shell having a conical bore diverging inwardly, a second tubular member loosely contained in said shell, and two sets of pins movably mounted radially in said second tubular member and extending therethrough for engagement at their outer ends with said conical bores respectively and for engagement at their inner ends with said axle.

5. In a gauge of the class described, the combination of means for mounting the gauge on an axle, a gauge supporting member carried by said mounting means, parallel posts supported by said member and extending therefrom transversely of said axle, a head movable longitudinally on said posts, a clamping device for holding said head in desired position on said posts, said posts carrying graduations for setting said head on said posts, a shaft mounted in said head substantially parallel with said axle for rotary movement in said head, a yoke carried by said shaft and extending in opposite directions therefrom over the end portions of a brake shoe to be adjusted, cylindrical members carried by said yoke for engagement with the braking surface of the end portions of said brake shoe, a pointer carried by said head, and means connecting said pointer with said shaft, said pointer indicating the relative radial positions of said cylindrical members with respect to the axle, said mounting means comprising a tubular shell supporting said supporting member, a plug movable axially in one end of said shell, a first tubular member fitting in said shell and having a conical bore diverging inwardly and engaging said plug, the other end of said shell having a conical bore diverging inwardly, a second tubular member loosely contained in said shell, and two sets of pins movably mounted radially in said second tubular member and extending therethrough for engagement at their outer ends with said conical bores respectively and for engagement at their inner ends with said axle, the pins of each set being in a plane perpendicular to said axle and of the same length as each other.

6. In a gauge of the class described, the combination of means for mounting the gauge on an axle, a gauge supporting member carried by said mounting means, parallel posts supported by said member and extending therefrom transversely of said axle, a head movable longitudinally on said posts, a clamping device for holding said head in desired position on said posts, said posts carrying graduations for setting said head on said posts, a shaft mounted in said head substantially parallel with said axle for rotary movement in said head, a yoke carried by said shaft and extending in opposite directions therefrom over the end portions of a brake shoe to be adjusted, cylindrical members carried by said yoke for engagement with the braking surface of the end portions of said brake shoe, a pointer carried by said head, and means connecting said pointer with said shaft, said pointer indicating the relative radial positions of said cylindrical members with respect to the axle, said mounting means comprising a tubular shell supporting said supporting member, a plug movable axially in one end of said shell, a first tubular member fitting in said shell and having a conical bore diverging inwardly and engaging said plug, the other end of said shell having a conical bore diverging inwardly, a second tubular member loosely contained in said shell, two sets of pins movably mounted radially in said second tubular member and extending therethrough for engagement at their outer ends with conical bores respectively and for engagement at their inner ends with said axle, and a centering screw extending axially through said plug to engage a center in said axle.

7. In a gauge of the class described, the combination of means for mounting the gauge on an axle, a gauge supporting member carried by said mounting means parallel posts supported by said member and extending therefrom transversely of said axle, a head movable longitudinally on said posts, a clamping device for holding said head in desired position on said posts, said posts carrying graduations for setting said head on said posts, a shaft mounted in said head substantially parallel with said axle for rotary movement in said head, a yoke carried by said shaft and extending in opposite directions therefrom over the end portions of a brake shoe to be adjusted, cylindrical members carried by said yoke for engagement with the braking surface of the end portions of said brake shoe, a pointer carried by said head, and means connecting said pointer with said shaft, said pointer indicating the relative radial positions of said cylindrical members with respect to the axle, said mounting means comprising a tubular shell supporting said supporting member, a plug movable axially in one end of said shell, an element in said shell and operated by axial movement of said plug, and axle clamping devices engaging said shell and said element and movable radially by relative movement of said shell and plug axially, said shell and said plug having threaded engagement with each other.

8. In a gauge of the class described, the combination of means for mounting the gauge on an axle, a gauge supporting member carried by said mounting means, parallel posts supported by said member and extending therefrom transversely of said axle, a head movable longitudinally on said posts, a clamping device for holding said head in desired position on said posts, said posts carrying graduations for setting said head on said posts, a shaft mounted in said head substantially parallel with said axle for rotary movement in said head, a yoke carried by said shaft and extending in opposite directions therefrom over the end portions of a brake shoe to be adjusted, cylindrical members carried by said yoke for engagement with the braking surface of the end portions of said brake shoe, a pointer carried by said head, and means connecting said pointer with said shaft, said pointer indicating the relative radial positions of said cylindrical members with respect to the axle, said mounting means comprising a tubular shell supporting said supporting member, a plug movable axially in one end of said shell, an element in said shell and operated by axial movement of said plug, axle clamping devices engaging said shell and said element and movable radially by relative movement of said shell and plug axially, and a centering screw extending axially through said plug to engage a center in said axle, said shell and said plug having threaded engagement with each other.

9. In a gauge of the class described, the combination of means for mounting the gauge on an axle, a gauge supporting member carried by said mounting means, parallel posts supported by said member and extending therefrom transversely of said axle, a head movable longitudinally on said posts, a clamping device for holding said head in desired position on said posts, said posts carrying graduations for setting said head on said posts, a shaft mounted in said head substantially parallel with said axle for rotary movement in said head, a yoke carried by said shaft and extending in opposite directions therefrom over the end portions of a brake shoe to be adjusted, cylindrical members carried by said yoke for engagement with the braking surface of the end portions of said brake shoe, a pointer carried by said head, and means connecting said pointer with said shaft, said pointer indicating the relative radial positions of said cylindrical members with respect to the axle, said mounting means comprising a tubular shell supporting said supporting member, a plug movable axially in one end of said shell, a first tubular member fitting in said shell and having a conical bore diverging inwardly and engaging said plug, the other end of said shell having a conical bore diverging inwardly, a second tubular member loosely contained in said shell, and two sets of pins movably mounted radially in said second tubular member and extending therethrough for engagement at their outer ends with said conical bores respectively and for engagement at their inner ends with said axle, said shell and said plug having threaded engagement with each other.

10. In a gauge of the class described, the combination of means for mounting the gauge on an axle, a gauge supporting member carried by said mounting means, parallel posts supported by said member and extending therefrom transversely of said axle, a head movable longitudinally on said posts, a clamping device for holding said head in desired position on said posts, said posts carrying graduations for setting said head on said posts, a shaft mounted in said head substantially parallel with said axle for rotary movement in said head, a yoke carried by said shaft and extending in opposite directions therefrom over the end portions of a brake shoe to be adjusted, cylindrical members carried by said yoke for engagement with the braking surface of the end portions of said brake shoe, a pointer carried by said head, and means connecting said pointer with said shaft, said pointer indicating the relative radial positions of said cylindrical members with respect to the axle, said mounting means comprising a tubular shell supporting said supporting member, a plug movable axially in one end of said shell, a first tubular member fitting in said shell and having a conical bore diverging inwardly and engaging said plug, the other end of said shell having a conical bore diverging inwardly, a second tubular member loosely contained in said shell, and two sets of pins movably mounted radially in said second tubular member and extending therethrough for engagement at their outer ends with said conical bores respectively and for engagement at their inner ends with said axle, the pins of each set being in a plane perpendicular to the axle and of the same length as each other, said shell and said plug having threaded engagement with each other.

11. In a gauge of the class described, the combination of means for mounting the gauge on an axle, a gauge supporting member carried by said mounting means, parallel posts supported by said member and extending therefrom transversely of said axle, a head movable longitudinally on said posts, a clamping device for holding said head in desired position on said posts, said posts carrying graduations for setting said head on said posts, a shaft mounted in said head substantially parallel with said axle for rotary movement in said head, a yoke carried by said shaft and extending in opposite directions therefrom over the end portions of a brake shoe to be adjusted, cylindrical members carried by said yoke for engagement with the braking surface of the end portions of said brake shoe, a pointer carried by said head and connected with said shaft and indicating the relative radial positions of said cylindrical members with respect to the axle, multiplying levers connecting said shaft and said pointer, and a dial carried by said head adjacent said pointer.

12. In a gauge of the class described, the combination of means for mounting the gauge on an axle, a gauge supporting member carried by said mounting means, parallel posts supported by said member and extending therefrom transversely of said axle, a head movable longitudinally on said posts, a clamping device for holding said head in desired position on said posts, said posts carrying graduations for setting said head on said posts, a shaft mounted in said head substantially parallel with said axle for rotary movement in said head, a yoke carried by said shaft and extending in opposite directions therefrom over the end portions of a brake shoe to be adjusted, cylindrical members carried by said yoke for engagement with the braking surface of the end portions of said brake shoe, a pointer carried by said head and connected with said shaft and indicating the relative radial positions of said cylindrical members with respect to the axle, said mounting means comprising a tubular shell supporting said supporting member, a plug movable axially in one end of said shell, a first tubular member fitting in said shell and having a conical bore diverging inwardly and engaging said plug, the other end of said shell having a conical bore diverging inwardly, a second tubular member loosely contained in said shell, two sets of pins movably mounted radially in said second tubular member and extending therethrough for engagement at their outer ends with said conical bores respectively and for engagement at their inner ends with said axle, the pins of each set being in a plane perpendicular to said axle and of the same length as each other, multiplying levers connecting said shaft and said pointer, and a dial carried by said head adjacent said pointer.

13. In a gauge of the class described, the combination of means for mounting the gauge on an axle, a gauge supporting member carried by said mounting means, parallel posts supported by said member and extending therefrom transversely of said axle, a head movable longitudinally on said posts, a clamping device for holding said head in desired position on said posts, said posts carrying graduations for setting said head on said posts, a shaft mounted in said head substantially parallel with said axle for rotary movement in said head, a yoke carried by said shaft and extending in opposite directions therefrom over the end portions of a brake shoe to be adjusted, cylindrical members carried by said yoke for engagement with the braking surface of the end portions of said brake shoe, a pointer carried by said head and connected with said shaft and indicating the relative radial positions of said cylindrical members with respect to the axle, said mounting means comprising a tubular shell supporting said supporting member, a plug movable axially in one end of said shell, a first tubular member fitting in said shell and having a conical bore diverging inwardly and engaging said plug, the other end of said shell having a conical bore diverging inwardly, a second tubular member loosely contained in said shell, two sets of pins movably mounted radially in said second tubular member and extending therethrough for engagement at their outer ends with said conical bores respectively and for engagement at their inner ends with said axle, the pins of each set being in a plane perpendicular to the axle and of the same length as each other, said shell and said plug having threaded engagement with each other, multiplying levers connecting said shaft and said pointer, and a dial carried by said head adjacent said pointer.

14. In a gauge of the class described, the comnation of mounting means for engaging an axle, a head, devices supporting said head on said mounting means, a rocking member carried by said head and having two gauging surfaces for simultaneous engagement with portions of a brake shoe separated circumferentially a substantial distance, and indicating means connected with said rocking member and operated by movement of said rocking member relatively to said head.

15. In a gauge of the class described, the combination of mounting means for engaging an axle, a head, devices supporting said head on said mounting means, a rocking member carried by said head and having two gauging surfaces for simultaneous engagement with portions of a brake shoe separated circumferentially a substantial distance, an indicating member connected with said rocking member and operated by movement of said rocking member relatively to said head, and multiplying levers connecting said rocking member with said indicating member.

16. In a gauge of the class described, the combination of mounting means for engaging an axle, a head carried by said mounting means, a rocking member carried by said head and having two gauging surfaces for simultaneous engagement with portions of a brake shoe separated circumferentially a substantial distance, an indicating member connected with said rocking member and operated by movement of said rocking member relatively to said head, and means including a post extending from said mounting means and in sliding engagement with said head to support the latter, said post having graduations thereon in terms of brake drum diameters of different sizes and located and spaced to compensate for brake shoe clearances and said two point engagement of said rocking member, whereby setting said head on said post at a given brake drum diameter places said gauging surfaces in correct position for setting the corresponding brake shoe with desired clearance.

17. In a gauge of the class described, the combination of mounting means for engaging an axle, a head, devices supporting said head on said mounting means, a rocking member carried by said head and having two gauging surfaces for simultaneous engagement with portions of a brake shoe separated circumferentially a substantial distance, an indicating member connected with said rocking member and operated by movement of said rocking member relatively to said head, and a dial adjacent said indicating member, whereby desired different clearances at the end portions of said brake shoe may be determined by the relation of said indicating member to said dial.

18. In a gauge of the class described, the combination of mounting means for engaging an axle, a head, devices supporting said head on said mounting means, a rocking member carried by said head and having two gauging surfaces for simultaneous engagement with portions of a brake shoe separated circumferentially a substantial distance, an indicating member connected with said rocking member and operated by movement of said rocking member relatively to said head, multiplying levers connecting said rocking member with said indicating member, and a dial adjacent said indicating member, whereby desired different clearances at the end portions of said brake shoe may be determined by the relation of said indicating member to said dial.

19. In a gauge of the class described, the combination of mounting means for engaging an axle, a head carried by said mounting means, a rocking member carried by said head and having two gauging surfaces for simultaneous engagement with portions of a brake shoe separated circumferentially a substantial distance, an indicating member connected with said rocking member and operated by movement of said rocking member relatively to said head, means including a post extending from said mounting means and in sliding engagement with said head to support the latter, said post having graduations thereon in terms of brake drum diameters of different sizes and located and spaced to compensate for brake shoe clearances and said two point engagement of said rocking member, whereby setting said head on said post at a given brake drum diameter places said gauging surfaces in correct position for setting the corresponding brake shoe with desired clearance, and a dial adjacent said indicating member, whereby desired different clearances at the end portions of said brake shoe may be determined by the relation of said indicating member to said dial.

JACK KUHLE.